United States Patent [19]
Bronstert et al.

[11] Patent Number: 4,835,220
[45] Date of Patent: May 30, 1989

[54] TRANSPARENT, IMPACT-RESISTANT STYRENE BLOCK POLYMERS AND THEIR PREPARATION

[75] Inventors: Klaus Bronstert, Carlsberg; Karl Gerberding, Wachenheim; Helmut Jenne, Schriesheim, all of Fed. Rep. of Germany

[73] Assignee: BASF Aktiengesellschaft, Ludwigshafen, Fed. Rep. of Germany

[21] Appl. No.: 923,094

[22] Filed: Oct. 24, 1986

[30] Foreign Application Priority Data

Oct. 24, 1985 [DE] Fed. Rep. of Germany ....... 3537772

[51] Int. Cl.$^4$ ..................... C08F 297/04; C08L 53/02
[52] U.S. Cl. .................................. 525/250; 525/271; 525/285; 525/314; 525/363; 525/370; 525/371; 525/385; 525/386
[58] Field of Search ............... 525/370, 250, 385, 386, 525/371, 363, 285

[56] References Cited

U.S. PATENT DOCUMENTS

| 3,639,517 | 2/1972 | Kitchen et al. | 260/879 |
| 3,976,628 | 8/1976 | Halasa et al. | 525/366 |
| 4,104,330 | 8/1978 | Danzig et al. | |
| 4,465,809 | 8/1984 | Smith | 525/385 |
| 4,603,171 | 7/1986 | Hsieh et al. | 525/370 |

OTHER PUBLICATIONS

Patent Abstracts of Japan, vol. 5, No. 195 (C-83)(867), Dec. 11, 1981: JP-A-56-118405.

Primary Examiner—Wilbert J. Briggs, Sr.
Attorney, Agent, or Firm—Keil & Weinkauf

[57] ABSTRACT

Block polymers of vinylaromatic compounds and conjugated dienes which possess acidic terminal groups, are present in the form of lithium salts and form an aluminum complex. A process for the preparation of such complexes and the use of these block polymer complexes as molding materials and for modifying thermoplastic materials.

4 Claims, No Drawings

TRANSPARENT, IMPACT-RESISTANT STYRENE BLOCK POLYMERS AND THEIR PREPARATION

The present invention relates to block polymers of vinylaromatics and conjugated dienes, which possess terminal acidic groups and are present in the form of lithium salts and complexes of an aluminum compound.

It is known that polymerization of styrene and butadiene with a lithium-hydrocarbon as an initiator gives block copolymers in which one or more nonelastomeric polymer blocks are associated with one or more elastomeric polymer blocks. Depending on the content of polymer blocks in the total polymer, these thermoplastic block copolymers possess nonelastomeric or elastomeric properties. Successive polymerization of the monomers gives block copolymers having a linear structure. If such linear block copolymers are coupled to one another via functional reactive compounds, branched block copolymers result, as described in, for example, British Patent No. 985,614. These have a symmetrical structure and generally exhibit improved processability compared with the linear block copolymers.

It is also known that styrene/butadiene block copolymers having a high styrene content are transparent, impact-resistant thermoplastic products. Although the block copolymers of this type which have been developed and proposed to date have satisfactory properties in some respects, they still do not meet many of the requirements set in practice.

German Laid-Open Application DOS No. 1,959,922 describes branched block copolymers which have a star-shaped structure and consist of a predominant amount of styrene and a smaller amount of a conjugated diene, and are said to combine impact strength, transparency, good processability and external stability in one polymer. These branched block copolymers are obtained by coupling two-block styrene/diene copolymers in which the terminal polystyrene blocks have different block lengths, with the result that an asymmetric structure is obtained in the branched block copolymers. Although these products have improved properties compared with the symmetric branched block copolymers, they are not completely satisfactory in respect of their mechanical properties, in particular their impact strength.

Block polymers of styrene and butadiene which are obtained using a lithium-hydrocarbon as an initiator and carry terminal carboxyl groups are known. They are disclosed in, for example, German Laid-Open Application DOS No. 2,723,905, where these compounds are obtained by subjecting first styrene and then butadiene to anionic polymerization and then reacting the living block polymer with an alkylene oxide, e.g. ethylene oxide, and finally subjecting the reaction product to a further reaction with a cyclic dicarboxylic anhydride. The block polymers obtained carry a terminal carboxyl group. Block polymers of this type have different properties, depending on the styrene content; for example, those which have a high styrene content can be used as thermoplastics. We have found that, although the mechanical and processing properties, in most cases are sufficient for a particular purpose, they are unsatisfactory for some applications.

It is an object of the present invention to improve the mechanical and processing properties of such block polymers, which possess terminal carboxyl groups and are present as lithium salts.

We have found that this object is achieved by block polymers which possess terminal carboxyl groups and are present as salts of the general formula

where $R^1$ is a block polymer of a monovinylaromatic compound and of a conjugated diene, which contains from 60 to 95% by weight of the former and from 40 to 5% by weight of the latter as copolymerized units, Y is an alkylene oxide unit, X is a group of the general formula

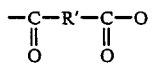

in which $R'$ is a divalent organic radical, $R^2$ is hydrogen or alkyl, a is from 1 to 10 and n is from 0.3 to 3.

The present invention furthermore relates to a process for the preparation of block polymers of this type by anionic polymerization of vinylaromatics and conjugated dienes and reaction of the resulting block polymers with an alkylene oxide and a cyclic anhydride, wherein the reaction product obtained is further reacted with an aluminum compound.

The present invention furthermore relates to the use of such block polymers in thermoplastic materials, for example for modifying thermoplastic materials, or as a component of molding materials.

Other subjects of the invention are evident from the description below.

The novel block polymers possess high transparency and clarity, very good impact strength coupled with great rigidity, and good processability, for example to give films, so that they are particularly useful for the production of blown films. We have also found that the molding materials produced using such block polymers have a particularly small number of specks.

In the stated polymers, $R^1$ is a radical of a block polymer of a vinylaromatic compound and a conjugated diene the said polymer being obtained by a lithium-alkyl-catalyzed reaction of the starting monomers. The starting materials for these block polymers are monovinylaromatic monomers, such as styrene, styrenes which are alkylated in the side chain, such as α-methylstyrene, and styrenes which are substituted in the nucleus, such as vinyltoluene or ethylvinylbenzene. The monovinylaromatic monomers may also be used as mixtures. However, styrene is preferably used alone. Examples of conjugated dienes which are copolymerized in the block polymers are butadiene, isoprene and 2,3-dimethylbutadiene. Butadiene and isoprene are particularly advantageous, butadiene being preferred.

The radicals R of the block copolymers of the invention should contain in total, as copolymerized units, from 60 to 95, in particular from 70 to 90, % by weight of the monovinylaromatic compound and from 40 to 5, preferably from 30 to 10, % by weight of the conjugated diene, the percentages in each case being based on the total amount of monomers used. The molecular weight of the polymers is as a rule from 30,000 to 500,000, preferably from 50,000 to 200,000. The stated molecular weights are weight average molecular weights, determined by viscosity measurements in toluene at 25° C.

The novel block copolymers are prepared by successive polymerization of the monomers in solution in the presence of a monolithium-hydrocarbon as an initiator, with stepwise addition of the monomers and, where relevant, initiator, followed by successive reaction with an alkylene oxide, a cyclic anhydride and an aluminum compound.

The block polymer $R^1$ can have a structure A-B, where A is the polymer unit which contains the monovinylaromatic monomers as copolymerized units, and block B is the polymer component composed of the conjugated dienes. In this case, either block A or block B can be bonded to the alkylene oxide unit Y. However, it is also possible to use block polymers of the A-B-A or B-A-B type. The groups of blocks can be repeated several times. Preferred polymer units $R^1$ are those which consist only of two blocks A and B, block B being bonded to the alkylene oxide unit Y. Polymer units $R^1$ which consist of three A-B-A blocks and in which one of the blocks A is bonded to the alkylene oxide unit Y are particularly preferred. The polymer blocks or segments A have a molecular weight of from 1500 to 150,000, preferably from 5000 to 100,000, and the polymer blocks or segments B have a molecular weight of from 2000 to 200,000, preferably from 20,000 to 100,000. The transition between two polymer blocks A and B can be abrupt (sharply separated blocks) or gradual (indistinct or conical blocks).

Such block polymers containing indistinct or conical blocks are obtained if mixtures of, for example, styrene and butadiene are polymerized. However, it is also possible to use block polymers in which the blocks A and B are copolymers of the monovinylaromatic monomers and the conjugated dienes. The glass transition temperature of the polymer blocks or segments A in such polymers is greater than 0° C., preferably greater than 20° C. The polymer blocks or segments B have a glass transition temperature of less than 0° C., preferably less than −15° C. In the block polymer component $R^1$, it is also possible for some or all of the olefinic double bonds derived from the diene building blocks to be hydrogenated.

In the preferred embodiment, the nonelastomeric polymer segment $A^1$ is first prepared by polymerizing a substantial part of the total amount of the monovinylaromatic compound by means of a relatively small amount of the monolithium-hydrocarbon initiator in an inert solvent under conventional conditions. In this procedure, from 50 to 80, preferably from 60 to 75, % by weight of the total amount of the monovinylaromatic compound used for the preparation of the branched block copolymers should be employed.

The amount of initiator used in the first process stage depends in particular on the desired molecular weight of the polymer and is generally from 0.1 to 10 millimoles per mol of the monovinylaromatic compounds used in this first process stage. For the polymerization in this stage, 0.2–1.5 millimoles of initiator are preferably used per mole of the monovinylaromatic compounds used here. Suitable initiators are the known monolithiumhydrocarbons of the general formula RLi where R is an aliphatic, cycloaliphatic, aromatic or araliphatic hydrocarbon radical of 1 to about 12 carbon atoms. Examples of lithium-hydrocarbon initiators employed according to the invention are methyllithium, ethyllithium, n-, sec- and tert-butyllithium, isopropyllithium, cyclohexyllithium, phenyllithium and p-tolyllithium. The monolithiumalkyl compounds where alkyl is of 2 to 6 carbon atoms are preferably used, n-butyllithium and secbutyllithium being particularly preferred.

The polymerization of the monovinylaromatic compounds is carried out in solution in an inert organic hydrocarbon solvent. Suitable hydrocarbon solvents are aliphatic, cycloaliphatic or aromatic hydrocarbons which are liquid under the reaction conditions and are preferably of 4 to 12 carbon atoms. Examples of suitable solvents are benzene, toluene, the xylenes, etc. Mixtures of these solvents may also be used. It is also possible to carry out the polymerization in the presence of small amounts, in general from $10^{-3}$ to 5% by weight, based on the total amount of solvent, of ethers, such as tetrahydrofuran, dimethoxyethane, phenyl methyl ether, etc. This makes it possible to influence the polymerization rate, the configuration of the butadiene polymer segments B and the random transition between the segments B and $A^3$ in a known manner. However, the reaction is preferably carried out without the addition of an ether. The concentration of the monomers in the reaction solution is not critical and may be such that any desired apparatus can be used for the polymerization.

Usually, polymerization is carried out using from 10 to 30% strength solutions in the inert solvent.

The polymerization is effected under the conditions conventionally used for anionic polymerization with organolithium compounds, for example an inert gas atmosphere and the absence of air and moisture. The polymerization temperature can be from 0° to 120° C. but is preferably kept at from 40° to 80° C.

The polymerization in this first process stage is continued until virtually complete conversion of the monovinylaromatic compounds used. This gives a solution of nonelastomeric living polymers of the monovinylaromatic compounds (polymer segment $A^1$) possessing active, terminal lithium-hydrocarbon bonds which are capable of undergoing further addition reactions with the monomers.

In the second process stage, a further amount of initiator and a further 1–30, preferably 5–25, % by weight of the total amount of the monovinylaromatic compounds used for the preparation of the branched block copolymers are added to this solution of the nonelastomeric living polymers based on the monovinylaromatic compounds possessing the lithium-terminated chain ends capable of undergoing polymerization. However, the sum of the amounts of monovinylaromatic compounds used in the first and second process stages should not exceed 90% by weight, based on the total amount of the mono-vinylaromatic compound used for the preparation of the branched block copolymers.

The amount of fresh initiator which is additionally added to the reaction solution in the second process stage is preferably the same as or larger than the initial amount of initiator which was employed in the first process stage of the polymerization. In the second process stage, it is particularly preferable if the amount of further fresh initiator added is from 1 to 15, particularly advantageously from 3 to 7, times the amount of initiator initially used. Suitable initiators are the monolithium-hydrocarbons, which can also be used in the first process stage; preferably, the initiator used is the same as that employed in the first process stage. It is advantageous if the additional of fresh initiator is added to the reaction solution before the further amount of the monovinylaromatic compound is introduced.

In the second process stage, the same polymerization conditions are maintained as in the first process stage, polymerization in this case too being continued until virtually complete conversion of the added monovinylaromatic compound is achieved.

The monomers added in the second process stage undergo addition at the active, lithium-terminated chain ends of the polymer segments $A^1$ formed beforehand in the first process stage, and furthermore new chains of living polymers are formed by the addition of fresh initiator.

After complete polymerization of the monomers in the second process stage, the solution present contains the living polymers of the monovinylaromatic compound with on average two different chain lengths. The reaction solution contains, on the one hand, the active, living nonelastomeric polymer segments of type $(A^1\text{-}A^2)\text{Li}$, which have been formed as a result of the monomers of the second process stage undergoing an addition reaction with the active, living polymer segments $A^1$-Li previously formed in the first process stage, and on the other hand active, living nonelastomeric polymer segments of type $A^2$-Li, which have been formed by polymerization of the monomers of the second process stage with the additionally introduced, fresh initiator. The ratio in which these two types of nonelastomeric polymer segments based on monovinylaromatic compounds are present in the reaction solution accordingly depends on the ratio of the amounts of initiator in the first and second process stages. Both types of polymer segments $(A^1\text{-}A^2)$ and $A^2$ have, at one of their chain ends, active, reactive lithium-carbon bonds capable of undergoing further addition reactions with monomers.

In a third process stage, the polymer segments B and, after this, the polymer segments $A^3$ are polymerized onto the active chain ends of the two types of nonelastomeric polymer segments $(A^1\text{-}A^2)$-Li and $A^2$-Li, with formation of the polymer blocks $(A^1\text{-}A^2\text{-}B\text{-}A^3)$ and $(A^2\text{-}B\text{-}A^3)$, which form the branches of the block copolymer. To do this, a monomer mixture consisting of the remaining monovinylaromatic compound and the total amount of conjugated diene is added to the completely polymerized reaction solution within the second process stage. The amount of conjugated diene is from 5 to 40, preferably from 10 to 30, % by weight, based on the total amount of monomers used for the preparation of the novel branched block copolymers. The monomer mixture is polymerized under the same conditions as for the two first process stages, once again until virtually complete conversion of the monomers is achieved.

Because of the different copolymerization parameters, the conjugated dienes polymerize substantially more rapidly than the monovinylaromatic compounds, so that, after the addition of the monomer mixture in the third process stage, initially the conjugated dienes are predominantly polymerized, and the monovinylaromatic compounds are polymerized only in isolated areas.

Only toward the end of the diene polymerization, i.e. when virtually all of the conjugated diene has been polymerized, does polymerization of the monovinylaromatic compounds occur to any noticeable extent, so that the predominant amount (as a rule more than 70% by weight and predominantly more than 80% by weight) of the monovinylaromatic compounds present in the monomer mixture are polymerized only after the conjugated dienes have been consumed.

In the third process stage, therefore, an elastomeric polymer segment B based on the conjugated dienes is first polymerized onto the nonelastomeric polymer segments $(A^1\text{-}A^2)$ and $A^2$, the said polymer segment B being a copolymer which consists mainly of the conjugated diene and small amounts of the monovinylaromatic compound; thereafter, a nonelastomeric polymer segment $A^3$ which is composed only of the monovinylaromatic compounds is formed. Since, toward the end of the polymer segment B, the amount of monovinylaromatic compounds increases steadily and the amount of conjugated diene accordingly shows a steady decrease, the transition between the polymer segments B and $A^3$ formed in this way is not sharp but gradual; hence, this is also frequently referred to as an indistinct transition between the segments. This fact is taken into account in the general formula of the novel branched block copolymers by the symbol $\rightarrow$.

After complete polymerization of the monomer mixture in the third process stage, the reaction solution contains a mixture of living, linear block copolymers of type $(A^1\text{-}A^2\text{-}B \rightarrow A^3)$-Li and $(A^2\text{-}B \rightarrow A^3)$-Li possessing active reactive lithium-carbon bonds at the free end of polymer segment $A^3$.

In a less preferable embodiment which is simpler but does not give optimum results, the polymerization may also be effected in only two process stages by initially taking the total amount of catalyst and, after process stage 1, polymerizing the total remaining amount of diene and styrene onto the hard segment $A^1$ as described in process stage 3. In this case, the resulting block copolymers are of uniform length.

The active, living linear block copolymers are then first reacted with an alkylene oxide in order to incorporate the alkylene oxide unit. Examples of suitable alkylene oxides are propylene oxide and higher straight-chain or branched alkylene oxides. Ethylene oxide is preferred, this being the only alkylene oxide which forms a primary terminal Li alcoholate group in this reaction; such groups are more suitable for the subsequent reaction with cyclic anhydrides than the secondary alcoholate groups formed from other alkylene oxides.

The reaction of lithium-terminated living polymers with ethylene oxide is well known and is described in, for example, German Laid-Open Application DOS No. 2,723,905. In general, it is sufficient to add not less than 1 mole, preferably from 1.5 to 2 moles, of alkylene oxide per mole of living polymer. In order to avoid undesirable side reactions, the reaction should be carried out at from 0° to 70° C., preferably from 20° to 50° C. It is complete when the intense orange color of the living polystyryl anion changes to colorless or pale yellow.

For the subsequent reaction with cyclic anhydrides, cyclic dicarboxylic anhydrides are preferred. Examples of these are succinic anhydride and its alkyl-substituted and halogen-substituted derivatives, maleic anhydride, glutaric anhydride, methylenesuccinic anhydride, dimethylenesuccinic anhydride, phthalic anhydride, the various naphthalenedicarboxylic anhydrides, cyclohexenedicarboxylic anhydride, etc. This list is not complete. In principle, all cyclic anhydrides of dicarboxylic acids which are capable of forming the group X defined above are suitable.

For the reaction of the polymeric Li alcoholates with the cyclic anhydride, it is necessary in general to use more than the stoichiometric amount of anhydride per mole of polymer in order to achieve an adequate conversion. A conversion of not less than 50% is sufficient, but 60% is preferable and conversions >70% are optimal. Such conversions are achieved if not less than 1.25, preferably 1.75, equivalents of cyclic anhydride are employed per mole of polymer. The optimum reaction temperature is 40°–60° C., a reaction time of about 1 hour being sufficient. However, the excess of cyclic anhydride should be kept as small as possible since this has an adverse effect on the properties of the end product.

The reaction with the aluminum compound follows, a complex being formed between this compound and the polymer. Particularly suitable aluminum compounds are the alcoholates, which are readily soluble in organic solvents, such as toluene, and are reacted in this form. An example of a particularly suitable compound is Al triisopropylate. Instead of the alcoholates, it is also possible to react aluminum-trialkyls, in which case, however, subsequent addition of water is necessary. This gives an aluminum hydroxide complex. The addition of small amounts of water to the reaction solution may also be advantageous when the alcoholates are used.

Formation of the Al complex is evident from a sharp increase in the solution viscosity, which generally reaches a limiting value when 3 moles of aluminum compound are present per mole of polymer. Hence, the amount of aluminum compound used should be not less than 0.3 mole and preferably not more than 1 mole. This complexing of the terminal groups results in a dramatic improvement in the properties of the end products.

Before being reacted with the aluminum compound, the block copolymer possessing carboxyl functional groups may be hydrogenated. Hydrogenation may be effected selectively or nonselectively and is usually carried out with the aid of molecular hydrogen and a catalyst based on a metal or metal salt of group 8 of the Periodic Table. It may be effected in the homogeneous phase using a catalyst based on a salt, in particular a carboxylate, alkoxide or enolate of cobalt, nickel or iron, which is reduced with a metal alkyl, in particular an aluminumalkyl, as described in, for example, U.S. Pat. No. 3,113,986, German Published Application DAS No. 1,222,260 or German Laid-Open Application DOS No. 2,013,263. The olefinic double bonds are hydrogenated under mild conditions under a hydrogen pressure of from 1 to 100 bar and at 25° to 150° C.

Hydrogenation may also be carried out in the heterogeneous phase using a nickel or platinum metal as a catalyst, under a hydrogen pressure of from 20 to 300 bar and at from 40° to 300° C. (for example as described in German Published Application DAS No. 1,106,961 or German Laid-Open Application No. 1,595,345). In this procedure, the aromatic double bonds too are hydrogenated, after the olefinic double bonds. The solvent used for the hydrogenation is preferably the same as that used in the preceding polymerization. The block copolymer may be partially or completely hydrogenated. Preferably, the olefinic double bonds of the polymer are selectively hydrogenated, and the hydrogenated block copolymers preferably contain less than 10%, in particular less than 3%, of olefinic double bonds.

After the reaction with the aluminum compound, the block copolymer is isolated from the reaction solution in a conventional manner, for example by precipitating and filtering off the polymer from the reaction solution.

In the polymers according to the invention, the complexed chain ends are probably aggregated. The increased solution viscosity corresponds to an increase in the apparent molecular weight to 3–6 times the value for the starting polymer.

The novel block copolymers, while possessing the same solution viscosity, have high transparency, clarity, impact strength and yield stress as well as unexpectedly high flow in comparison with conventional polymers. If novel polymers possessing a higher intrinsic viscosity are compared with known polymers of the same composition but of lower intrinsic viscosity, it is found that the polymers according to the invention have better mechanical properties coupled with good processability. They are therefore particularly suitable for the production of blown films, where they produce few specks and have little tendency to tear, which is a disadvantage of conventional polymers. Moreover, the diene content can be reduced to a greater extent than in the case of conventional polymers, the mechanical properties remaining similar.

The Examples which follow illustrate the invention. The intrinsic viscosity, measured on a sample taken before the reaction with ethylene oxide, in 0.5% strength solution in toluene at 25° C., is a measure of the molecular weight. The notched impact strength $a_{LK}$ was determined according to DIN 53,753 on compression-molded specimens. The yield stress $G_S$, tensile strength $G_R$ and elongation $E_R$ were measured on compression-molded dumbell-shaped bars according to DIN 53,455. Specks were assessed by counting on a 70 μm thick blown film produced in a Tröster MP 30 extruder at a throughput of 10 kg/h and a melt temperature of 200° C.

EXAMPLES 1 TO 3

In the method below, the preparation of novel transparent impact-resistant block polymers containing a) 25% (Example 1), b) 15% (Example 2) and c) 10% (Example 3) of butadiene is described. The amounts of reactants in each case are accordingly designated by a), b) and c).

5390 m³ of cyclohexane and a) 539 g, b) 612 g, c) 648 g of styrene are initially taken in a 10 pressure kettle and are titrated with a 1.5% strength secbutyllithium solution under an inert gas atmosphere until polymerization just begins. Thereafter, 3 millimoles of sec-butyllithium (as a 1.5 M solution in hexane) are added, and polymerization is carried out at from 50° to 60° C. for about one hour until conversion is complete. A further 15 millimoles of sec-butyllithium are added to the active reaction solution, after which a) 326 g, b) 373 g, c) 395 g are added, a) a mixture of 179 g of styrene and 375 g of butadiene, b) 205 g of butadiene, c) a mixture of 217 g of styrene and 140 g of butadiene is added, and polymerization is again carried out at from 50° to 60° C. until complete conversion of the monomers has occurred. This takes 1 hour. The intrinsic viscosity in toluene is a) 75, b) 73 and c) 72. Thereafter, 36 millimoles of ethylene oxide are added at 40° C. and the mixture is stirred for a further hour. 36 millimoles of succinic anhydride in the form of a finely divided suspension in cyclohexane, prepared by treatment in an Ultra-Turrax mixer for 30 minutes or milling in a ball mill, are then added, and stirring is continued for a further hour at 40° C. The intrinsic viscosity increases to a) 103, b) 105 and c) 99. 36 millimoles of aluminum triisopropylate are then mixed in, the intrinsic viscosity increasing to a) 115, b) 120 and c) 112. After the addition of 15 g of di-tert-butyl-p-cresol, the polymers are precipitated by pouring the mixture into about 20 of methanol with thorough stirring, and are then dried. The properties are shown in the table below.

The designations d, e and f are used in the comparative Examples 1, 2 and 3 below.

COMPARISONS 5390 m³ of cyclohexane and d) 535 g, e) 612 g, f) 648 g of styrene are initially taken in a 10 pressure kettle and titrated with sec-butyllithium under an inert gas atmosphere until polymerization just begins. Thereafter, d) 6 millimoles, b) 4.2 millimoles, f) 3.5 millimoles of sec-butyllithium are added and polymerization is carried out for 1 hour. A further d) 30, e) 21.3, f) 17.5 millimoles of sec-butyllithium are then added, followed by d) 326 g, e) 373 g, f) 395 g of styrene, and polymerization is continued at 50°-60° C. A mixture of d) 179 g of styrene and 375 g of butadiene, e) 205 g of styrene and 210 g of butadiene and f) 217 g of styrene and 140 g of butadiene is then added and polymerization is continued for about 2.5 hours at 50°-60° C. Thereafter, d) 4.9 g, e) 3.8 g, f) 286 g of an epoxidized linseed oil (tradename: Edenol from Henkel, Düsseldorf) are added and the mixture is stirred for 15 minutes at 60° C. It is treated overnight with carbon dioxide, while stirring, stabilized with di-tert-butyl-p-cresol, as described in Examples 1 to 3, and then worked up by precipitation with methanol and drying under reduced pressure.

| Example No. | Butadiene content parts | Intrinsic viscosity cm³/g | MFI (5 p, 200° C.) | $\sigma_S$* N/mm² | $\sigma_R$* N/mm² | $\epsilon_R$* % | $a_L$** KJ/M² | Number of specks*/m² | Processing behavior |
|---|---|---|---|---|---|---|---|---|---|
| 1 | 25 | 115 | 4 | 21 | 25 | 350 | 58 | 50 | does not tear |
| 2 | 15 | 120 | 3.2 | 33 | 24 | 280 | 25.1 | 30 | does not tear |
| 3 | 10 | 112 | 4.3 | 40 | 26 | 59 | 9 | 10 | does not tear |
| Comparison | | | | | | | | | |
| 1 | 25 | 72 | 14 | 20 | 17 | 260 | 29 | 300 | tears frequently |
| 2 | 15 | 80 | 4.0 | 23 | 19 | 24 | 5 | 200 | tears |
| 3 | 10 | 73 | 17 | — | 40 | 3 | 1 | 200 | tears very frequently |

*Number of specks by counting on a 70 μm thick blown film
**The frequency of tearing of a blown film was assessed (Troster extruder UP30, melt temperature 200° C., throughput 10 kg/h)
***Tensile test; measurements on compression-molded bars, KT = 230°C., $\sigma_S$ = yield stress, $\sigma_R$ = tensile stress at break, $\epsilon_R$ = elongation, standard bar 3 according to DIN 53,455
****Notched impact strength according to DIN 53,753

We claim:

1. A block polymer of vinylaromatic compounds and conjugated dienes which possesses acidic terminal groups, the said polymer being in the form of a complex of the formula $$[R^1\text{-}y_a\text{-}X^\ominus]Li^\oplus[Al(OR^2)_3]_n$$

where $R^1$ is a block polymer of a monovinylaromatic compound and a conjugated diene, which contains from 60 to 95% by weight of the former and from 40 to 50% by weight of the latter as copolymerized units and has a structure A-B, A-B-A or B-A-B, which can be repeated several times, where A is the polymer unit which contains the monovinylaromatic monomers as copolymerized units, and block B is the polymer component composed of the conjugated dienes; either block A or block B being bonded to an alkylene oxide unit Y, X is a group of the formula

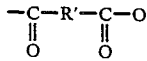

in which R' is a divalent organic radical, R² is hydrogen or alkyl, a is from 1 to 10 and n is from 0.3 to 3.

2. A block polymer as claimed in claim 1, wherein R' is

—CH₂—CH₂—, —CH=CH—, —CH₂—CH₂—CH₂

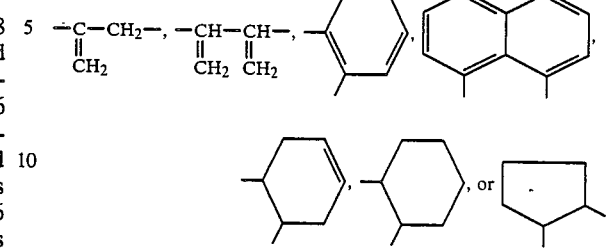

and these radicals in turn may be substituted by short alkyl chains and/or halogen.

3. A process for the preparation of a block polymer of vinylaromatic compounds and conjugated dienes by anionic polymerization of these compounds with a lithium-alkyl and reaction of the resulting living block polymer with an alkylene oxide and a cyclic anhydride, wherein the reaction product obtained is reacted with an aluminum alcoholate or with an aluminum trialkyl and water.

4. Block polymer of vinylaromatic compounds and conjugated dienes which possesses acidic terminal groups, the said polymer being in the form of a complex of the formula $$[R^1\text{-}y_a\text{-}X^\ominus]Li^\oplus[Al(OR^2)_3]_n$$

where $R^1$ is a block polymer of a monovinylaromatic compound and a conjugated diene, which contains from 60 to 95% by weight of the former and from 40 to 50% by weight of the latter as copolymerized units, and has a structure A-B, A-B-A or B-A-B, which can be repeated several times, where A is the polymer unit which contains the monovinylaromatic monomers as copolymerized units, and block B is the polymer component composed of the conjugated dienes; either block A or block B being bonded to an alkylene oxide unit Y,X is a group of the formula

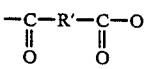

in which R' is a divalent organic radical, R² is hydrogen or alkyl, a is from 1 to 10 and n is from 0.3 to 3, as obtained by anionic polymerization of vinylaromatic compounds and conjugated dienes with a lithiumalkyl and reacting of the resulting living block polymer with an alkylene oxide and a cyclic anhydride, and reacting the reaction product with an aluminum alcoholate or with an aluminum trialkyl and water.

* * * * *